| (12) | United States Patent | (10) Patent No.: | US 10,920,771 B2 |
|---|---|---|---|
| | Böhm | (45) Date of Patent: | Feb. 16, 2021 |

(54) PUMP DRIVE FOR CONVEYING A REDUCING AGENT FOR MOTOR VEHICLE EXHAUST GAS SYSTEMS, MODULAR MOTOR AND PUMP FAMILY FOR FORMING DIFFERENT PUMP DRIVES WITH SEVERAL SUCH ELECTRIC MOTORS

(71) Applicant: Bühler Motor GmbH, Nuremberg (DE)

(72) Inventor: Karl-Heinz Böhm, Unterleinleiter (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 219 days.

(21) Appl. No.: 16/051,708

(22) Filed: Aug. 1, 2018

(65) Prior Publication Data

US 2018/0340533 A1    Nov. 29, 2018

Related U.S. Application Data

(63) Continuation of application No. PCT/DE2017/200010, filed on Jan. 30, 2017.

(30) Foreign Application Priority Data

Feb. 15, 2016   (DE) ..................... 10 2016 202 260.1

(51) Int. Cl.
*F04C 2/08*     (2006.01)
*F04C 2/10*     (2006.01)
(Continued)

(52) U.S. Cl.
CPC .............. *F04C 2/086* (2013.01); *F04C 2/101* (2013.01); *F04C 11/008* (2013.01);
(Continued)

(58) Field of Classification Search
CPC .... F04C 15/008; F04C 2240/30; F04C 2/084; F04C 3/085; F04C 11/008; F04C 2/102;
(Continued)

(56) References Cited

U.S. PATENT DOCUMENTS 5,219,276 A * 6/1993 Metzner ................. F04C 2/102
                                                        417/356
5,670,852 A * 9/1997 Chipperfield ........... F04B 49/06
                                                        318/250

(Continued)

FOREIGN PATENT DOCUMENTS

DE    10 2007 033 659 A1    1/2009
DE    10 2011 005 304 A1    3/2012
(Continued)

OTHER PUBLICATIONS

International Search Report dated May 15, 2017, issued in counterpart application No. PCT/DE2017/200010, w/English translation. (15 pages).

(Continued)

*Primary Examiner* — Dominick L Plakkoottam
(74) *Attorney, Agent, or Firm* — Westerman, Hattori, Daniels & Adrian, LLP (57) ABSTRACT

A pump drive for conveying a reducing agent for motor vehicle exhaust gas systems, with an electronically commutated direct current motor, a positive displacement pump, and a freezing compensation structure. Also, a modular motor and pump family for forming different pump drives with several such electric motors and pumps. It is the aim of the invention to ensure, in the simplest and most robust manner possible, the integration of a hydraulic unit (gear pump) into an electrical unit (electric motor), a sealing of a wet region from a dry region, an integration of a freezing compensation into the wet region, and a mechanical attachment on the customer side. A modular construction of the (Continued)

electric motor and of the positive displacement pump, which, without a large modification cost, via simple combination of assemblies or modules, can be used for different requirements, is important for this.

15 Claims, 5 Drawing Sheets (51) Int. Cl.
    *F04C 11/00*    (2006.01)
    *F04C 15/00*    (2006.01)
    *H02K 3/44*     (2006.01)

(52) U.S. Cl.
    CPC ........ *F04C 15/008* (2013.01); *F04C 15/0023* (2013.01); *H02K 3/44* (2013.01); *F04C 2230/60* (2013.01); *F04C 2240/30* (2013.01); *F04C 2240/56* (2013.01)

(58) Field of Classification Search
    CPC . F04C 2240/40; F04C 2240/403; F04C 2/086
    See application file for complete search history.

(56) References Cited

U.S. PATENT DOCUMENTS

| | | | | |
|---|---|---|---|---|
| 2006/0017339 | A1* | 1/2006 | Chordia | H02K 5/128 310/86 |
| 2006/0222527 | A1* | 10/2006 | Kurita | F04C 15/008 417/410.1 |
| 2008/0042503 | A1* | 2/2008 | Hartkorn | H02K 1/28 310/90 |
| 2009/0022610 | A1* | 1/2009 | Materne | F04D 13/0626 417/423.7 |
| 2010/0111730 | A1* | 5/2010 | Peterreins | F04D 13/064 417/423.7 |
| 2012/0211093 | A1* | 8/2012 | Grimes | F04C 11/008 137/334 |
| 2013/0202464 | A1* | 8/2013 | Miyaki | F04C 11/008 417/410.4 |
| 2014/0271282 | A1* | 9/2014 | Francini | F04C 15/0061 417/420 |
| 2015/0300355 | A1* | 10/2015 | Malvasi | F04D 7/00 417/423.7 |
| 2016/0230767 | A1* | 8/2016 | Thompson | H02K 11/05 |
| 2017/0167491 | A1* | 6/2017 | Reul | F04D 13/06 |

FOREIGN PATENT DOCUMENTS

| | | |
|---|---|---|
| DE | 10 2012 201 299 A1 | 8/2013 |
| DE | 10 2012 219 841 A1 | 10/2013 |
| EP | 2 538 082 A2 | 12/2012 |
| EP | 2 848 813 A1 | 3/2015 |
| JP | 2005-256676 A | 9/2005 |
| WO | 2009/149682 A2 | 12/2009 |

OTHER PUBLICATIONS

Search Report dated Aug. 16, 2016, issued in counterpart German Patent Application No. 10 2016 202 260.1 (8 pages).

* cited by examiner

PUMP DRIVE FOR CONVEYING A REDUCING AGENT FOR MOTOR VEHICLE EXHAUST GAS SYSTEMS, MODULAR MOTOR AND PUMP FAMILY FOR FORMING DIFFERENT PUMP DRIVES WITH SEVERAL SUCH ELECTRIC MOTORS

CROSS-REFERENCE TO RELATED APPLICATIONS

The present patent application is a continuation of International Application No. PCT/DE2017/200010, filed Jan. 30, 2017, which is based on, and claims priority from, German Application No. DE 102016202260.1, filed Feb. 15, 2016, both of which are incorporated herein by reference in their entireties.

BACKGROUND OF THE INVENTION

Field of the Invention

The invention relates to a pump drive for conveying a reducing agent for motor vehicle exhaust gas systems, with an electronically commutated direct current motor, a positive displacement pump, and a freezing compensation structure. The invention also relates to a modular motor and pump family for forming different pump drives with several such electric motors and pumps.

Description of Related Art Including Information Disclosed Under 37 CFR 1.97 and 1.98

The invention is used in motor vehicle combustion engines that generally emit a large amount of NOx (Oxides of nitrogen, especially as atmospheric pollutants). This is, in particular, the case with diesel motors, since these burn with an excess of oxygen in comparison to a gasoline motor. NOx is a noxious gas that endangers the environment and human health. The SCR (selective catalytic reaction) technique has long been known as a corrective measure, in which an aqueous urea solution is injected directly into the combustion exhaust gases of the exhaust gas line in order to thereby cause a chemical reduction reaction, which markedly reduces the quantity of the remaining NOx pollutants. The composition of the urea solution is regulated in ISO 22241-1. The high exhaust gas temperatures initially lead to a thermolysis and hydrolysis reaction in which ammonia ($NH_3$) is created. Among other things, the following reduction reaction subsequently takes place in an SCR catalyst: $NO+NO_2+2NH_3 \rightarrow 2N_2+3H_2O$. One advantage of the SCR technique also consists in this not decreasing the efficiency of the combustion engine.

An SCR system conventionally consists of a tank for the urea solution, a pumping system, an injector, and electronics which regulate the injection pressure and the injection duration. In order to achieve an optimal NOx reduction, it is important to dose the urea solution (also referred to as AdBlue), depending upon the nitrogen emission. Since the urea solution that is used promotes metallic corrosion, and its freezing point is at approximately 11.5° C., particular embodiments of the SCR system, in particular, of the SCR pump, are necessary in order to take these properties into account. As a rule, special structural embodiments must provide for sufficient protection against the ice pressure arising during the freezing process.

BRIEF SUMMARY OF THE INVENTION

Since the SCR technique means a significant technical expenditure, work is continuously being done to simplify this and thereby make it more economical.

It is therefore the aim of the invention to ensure, in the simplest and most robust manner possible, the integration of a hydraulic unit (positive displacement pump) into an electrical unit (electric motor), a sealing of a wet region from a dry region, an integration of freezing compensation into the wet region, a mechanical attachment on the customer side, hydraulic connection on the customer side, and a modular construction. An additional aim consists in fulfilling a large variety of usage possibilities and requirements with regard to delivery pressure range and discharge rate, with the fewest possible modifications and with a minimal number of parts. A modular construction of the electric motor and of the positive displacement pump, which, without a large modification cost, via simple combination of assemblies or modules, can be used for different requirements, is important for this.

The invention is based upon the idea of providing a wound stator core that is extrusion-coated with a plastic material that can be processed in an injection molding technique, which wound stator core forms a stator assembly that is compact and sealed against the fluid to be conveyed, and of accommodating the positive displacement pump in the stator assembly axially relative to the permanent magnet rotor, and attaching it to the stator assembly. Due to the extrusion coating, a separating can may be foregone; in addition to this, a significant freedom of design is achieved. Installation steps may, additionally, be omitted or simplified.

In a first embodiment, it is provided that the stator assembly have a rotor accommodation space with a first internal diameter d1 and a pump accommodation space with a second internal diameter d2, wherein the second internal diameter d2 is larger than the first internal diameter d1, whereby a shoulder is formed.

The installation of a metallic elastic means between the stator assembly and a multi-part pump housing allows a necessary balance of play between the stator assembly and the positive displacement pump. This elastic means is preferably an undulating washer, which is very simple in design and available at any time. Alternatively, the elastic means may serve as an attachment means which is arranged between one or more screws and the positive displacement pump, outside of a wet region. For this, a crown-shaped metallic spring may be installed at the stator assembly with the aid of screws. With a symmetrical design, the positive displacement pump may thereby assume an arbitrary angle position in relation to the stator assembly.

The positive displacement pump may, advantageously, be screwed to the stator assembly in such a way that the screw or screws is/are screwed into the plastic material of the stator assembly. For this, it is reasonable to select a material with high strength as a plastic material for the stator assembly. It is provided for thermosetting plastic material for the stator assembly to be used, because this may satisfy high sealing requirements and high strength requirements.

According to a further aspect of the invention, it is provided that the stator core comprise attachment projections which are provided with feedthroughs. The attachment projections serve for the attachment, in particular, screwing, of the stator assembly, and therefore of the pump drive, to a tank of an SCR system, for example. Alternatively, attachment projections may also be formed by the plastic material of the stator assembly, or by a combination of plastic material and stator core material.

In order to seal the wet region from a dry region outside of the pump drive, a seal ring is arranged between the stator assembly and the pump housing. The seal ring is preferably a radial seal ring, in particular, an annular cord seal (O-ring). The seal ring is placed into an annular space which is formed, on one side, by a third internal diameter d3 of the stator assemble which is larger than the second internal diameter d2, and, on the other side, by an axially-recessed annular region of a pump head.

It is further provided that the permanent magnet rotor and the greater part of the positive displacement pump be arranged in the wet region, wherein the wet region is bounded by the stator assembly and by a pump head. A single seal ring is thereby sufficient for sealing the pump drive.

The positive displacement pump may have a pump housing that is formed in two or three parts. Preferably, a three-part pump housing is provided, wherein the pump head, a middle part, and a pump cover are provided. The middle part is arranged, sandwich-like, between the pump head and the pump cover.

The positive displacement pump, expediently, includes a freezing compensation structure. This consists of an elastic and yielding, in particular, rubber-like-material. The freezing compensation structure serves to form a compressible compensation space which compensates for a volume increase due to the freezing pumping medium, for example, aqueous urea solution.

A simple installation possibility consists in the freezing compensation structure being positively connected to the pump housing via master forming. For this, connection projections which hold the freezing compensation structure in a positive fit are injection molded with the pump cover. The pump housing preferably consists of a thermosetting plastic material, or, alternatively, of a sintered metal material.

It is also provided that, in the plastic material of the stator assembly, sensors are arranged axially, relative to the permanent magnet rotor. These sensors are sensors for detecting the magnetic field surrounding the permanent magnet rotor. In particular, Hall effect sensors or GMR sensors are therefore suitable here. The sensors serve as rotor position sensors, and are electrically connected to a wiring unit via baffle plates embedded into the plastic material of the stator assembly. The wiring unit essentially consists of a plug terminal, which additionally serves as a wiring means for individual coils of the winding.

The second aim is achieved via a modular pump drive family for covering different delivery pressure ranges and/or discharge rate ranges, wherein the wound stator core is extrusion-coated by a plastic material that can be processed via injection molding, the wound stator core thereby forming a stator assembly that is compact and sealed against the fluid to be conveyed; the positive displacement pump is accommodated axially relative to the permanent magnet rotor in the stator assembly and is attached to said stator assembly; and the individual pump drives differ from one another via different stator lengths, stator diameters, rotor lengths, rotor diameters, and/or different positive displacement pumps, and/or equipment variants; and the equipment variants have the following equipment features: control electronics for activating windings of the stator assembly, and/or at least one position sensor integrated into the electronically commutated electric motor.

Control electronics integrated into the pump drive may be completely omitted. In this instance, the control tasks are reasonably taken on by an external control module which is, for example, a component of a system controller.

BRIEF DESCRIPTION OF THE SEVERAL VIEWS OF THE DRAWINGS

The invention is explained in detail in the following, using an exemplary embodiment. The following is shown.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. The reference numbers with apostrophe and the corresponding reference numbers without apostrophe refer to details with the same name in the drawings and the drawing description. This reflects use in another embodiment, the prior art, and/or where the detail is a variant. The reference number list contains only reference numbers without apostrophe for the sake of simplicity.

Figure 1:
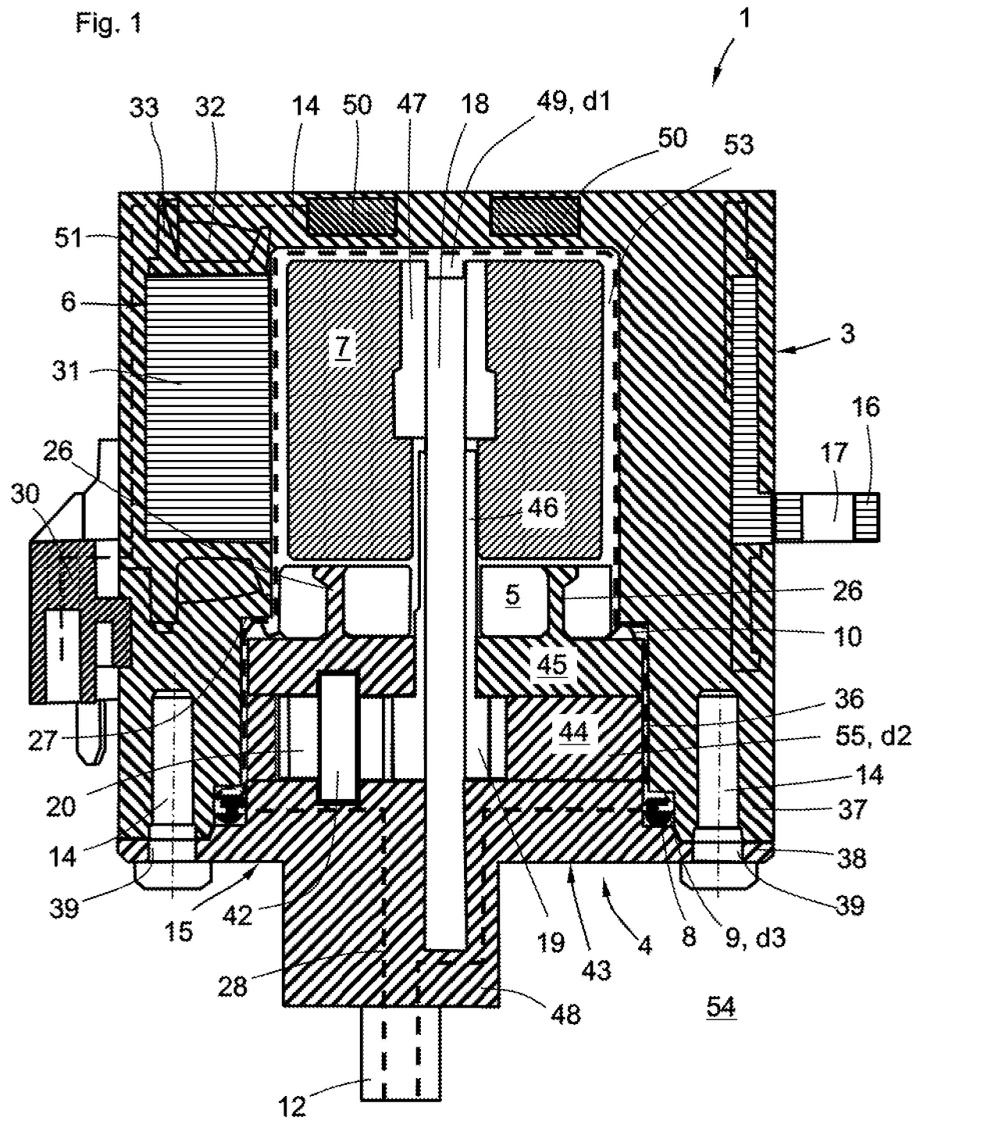
FIG. 1 is a sectional view through a first embodiment of the invention.

FIG. 1 shows a section view through a first embodiment of a pump drive 1, with an electronically commutated direct current motor 3 consisting of a wound stator assembly 6; a permanent magnet rotor 7; a central axle 18; and a gear pump 4 having a first gear 19 which is integrally formed with a hollow shaft 46 protruding into the gear pump 4 and a second gear 20 driven by the first gear 19, which second gear 20 is accommodated on an axle 42; and a fluid inlet 12. The gears 19, 20 here consist of PEEK (Polyetheretherketone). The axle 42 is arranged in a pump housing 15, wherein the pump housing 15 is executed in three parts; it consists of a pump head 43, a middle part 44, and a pump cover 45. The central axle 18 and the axle 42 are fixed in the pump head 43 and are radially supported directly or via the hollow shaft 46 in the pump cover 45. The pump head 43 is provided with an axial projection 48 which ensures a sufficiently long attachment region for the central axle 18 and holds this at one side. At the opposite end of the central axis 18, this is supported neither radially nor axially, and freely protrudes into a rotor accommodation space 49. The pump housing parts 43, 44, and 45 rest radially on the stator assembly 6 (this fact is covered in FIG. 1 due to a drawn dashed line). The permanent magnet rotor 7 consists of a PPS-bound ferrite and is connected in a rotationally fixed manner to the hollow shaft 46, and is borne on the axle 42 via a bearing bushing 47. The bearing bushing 47 is extrusion-coated with the permanent magnet material of the permanent magnet rotor 7. The connection between the permanent magnet rotor 7 and the hollow shaft 46 is provided via a hexagonal contour. Here, a fluid outlet 13 is occluded by the fluid inlet 12 (see in this regard FIG. 3).

A freezing compensation structure 5 is connected to the positive displacement pump/gear pump 4 via master forming; for this purpose, this is held in a positive fit by peg-like connection projections 26 of the pump housing 15. The pump housing 15 consists of a plastic material that can be processed via an injection molding technique, and the freezing compensation structure 5 consists of an elastic and yielding material. An elastic means 10 in the form of an undulating washer is supported on a shoulder 27 of the stator assembly 6, and on the pump housing 15 near the freezing compensation structure 5. The elastic means 10 serves as a balance of play between the gear pump 4 and the stator assembly 6. The pump housing parts 43, 44, and 45 are held together by the elastic means 10. The elastic means 10 may additionally serve as a compensation means in the event of freezing.

The stator assembly 6 comprises a stator core 31 in the form of a laminated core that is radially extended at multiple locations, and, at these locations, forms attachment projections 16 in which is respectively provided a feedthrough 17 for an attachment element. The stator core 31 has stator slots 40 into which insulation bodies 33 are placed and which are wound with a winding 32. A dividing line 28, which is represented by a dashed line, indicates a sealed separation between the stator assembly 6 and the permanent magnet rotor 7 as well as the positive displacement pump 4; it is thereby the dividing line between a wet region 53 and a dry region 54 outside of the pump drive 1. A guide contour 36 serves for radial, positive-fit accommodation of the gear pump 4 in an axially projecting extension 37 of the stator assembly 6. A pump flange 38 of the pump housing 15 serves as an axial stop for the gear pump 4. The pump flange 38 has openings 39 for screws 14. The pump drive 1 also comprises sensors 50 that, in the plastic material of the stator assembly 6, are embedded axially to the permanent magnet rotor 7. A sensor connection line 51, indicated in dashes, shows its course within the stator assembly 6. The sensor connection line 51 is executed as a baffle plate which is embedded in the plastic material of the stator assembly 6 and connects the sensors 50 to the wiring unit 30.

Figure 2:
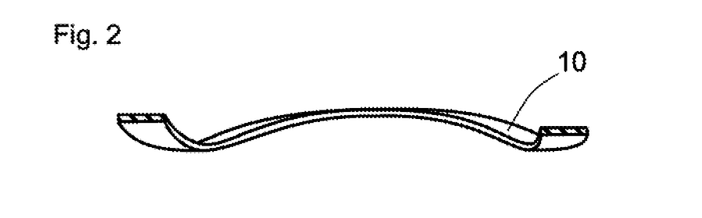
FIG. 2 is a perspective view of an undulating washer.

FIG. 2 shows an elastic means 10 in the form of an undulating washer that serves for the placement of the pump cover 45 on the middle part 44 and the pump head 34 (see FIG. 1). The undulating washer is a standard component.

Figure 3:
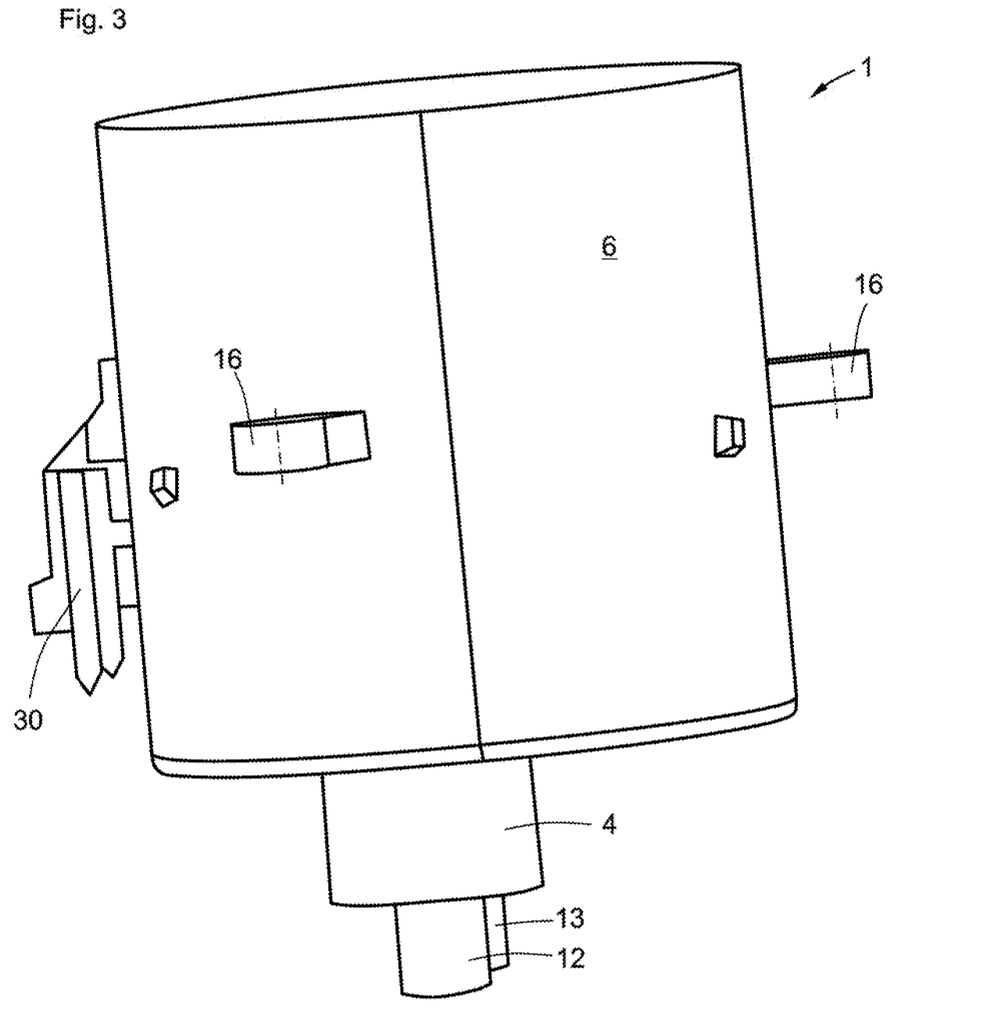
FIG. 3 is a perspective view of the first embodiment.

FIG. 3 shows a three-dimensional depiction of the first embodiment, with the stator assembly 6, the attachment projections 16, the gear pump 4, the fluid inlet 12, the fluid outlet 13, and the wiring unit 30. Fluid inlet 12 and fluid outlet 13 are depicted only in a stylized manner.

Figure 4:
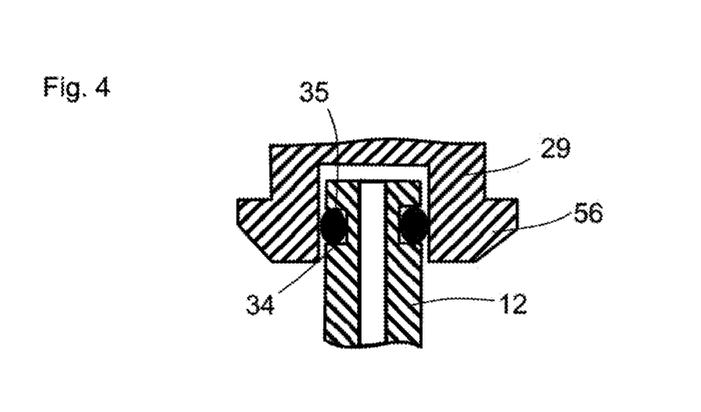
FIG. 4 is a sectional view of a fluid inlet.

FIG. 4 shows a customer-side hydraulic connection 29 to the fluid inlet 12. The same connection is provided for the fluid outlet 13. A mold contour 56 serves for the mechanical fixation of the hydraulic connection 29. A connection seal 35 is inserted into a groove 34 of the hydraulic connection and seals against the fluid inlet 12.

Figure 5:
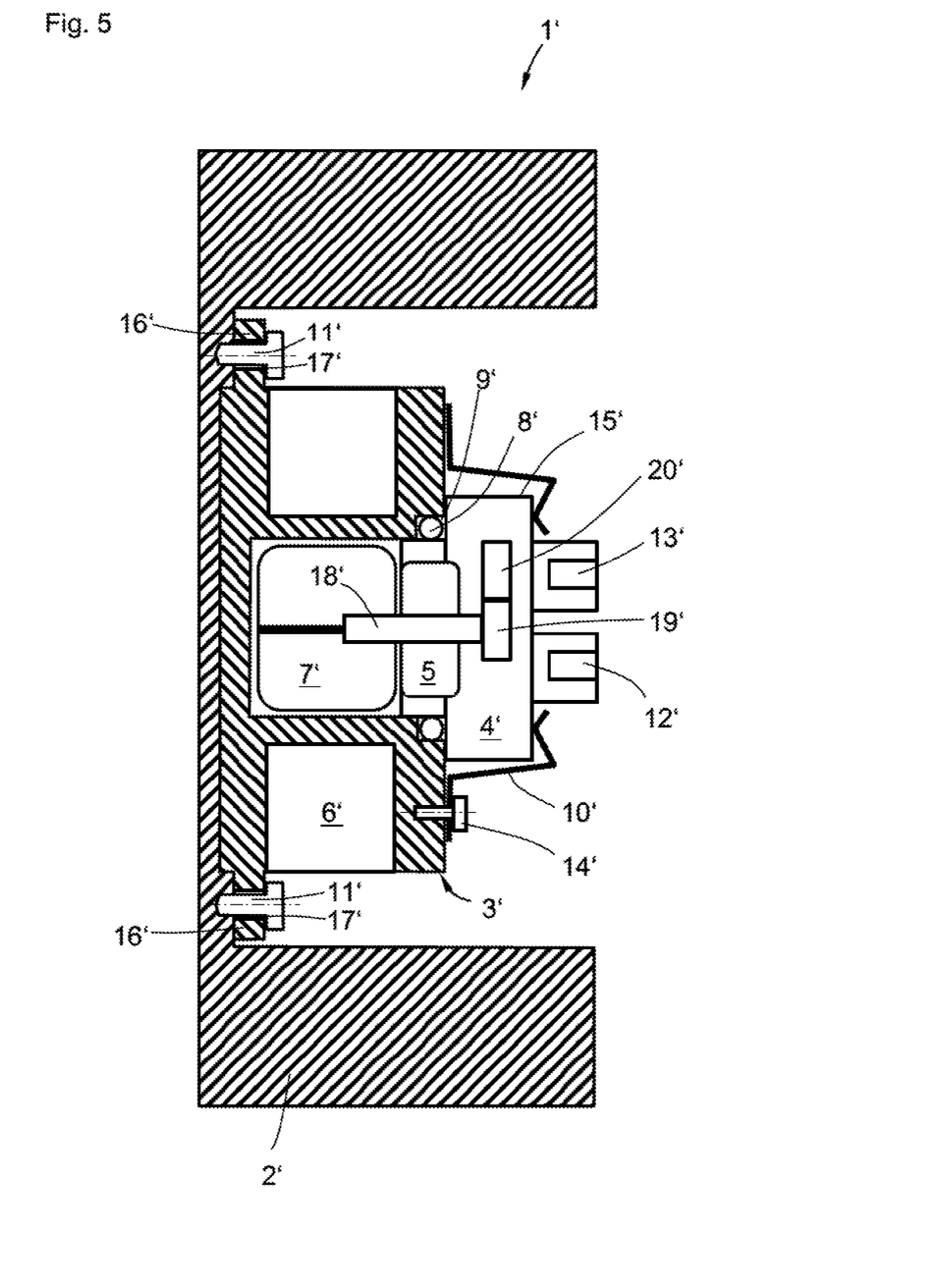
FIG. 5 is a sectional view through an SCR pumping system.

FIG. 5 shows a sectional view through a second embodiment of a pump drive 1', with a tank 2', an electronically commutated direct current motor 3', a gear pump 4', and a freezing compensation structure 5'. The electronically commutated direct current motor 3' consists of a wound stator assembly 6' and a permanent magnet rotor 7'. The permanent magnet rotor 7' is in a rotationally fixed connection to a first gear 19' via a central axle 18'. A second gear 20' is moved as well by the first gear 19'. Arranged between the gear pump 4' and the stator assembly 6' is a seal ring 8' in a stepped annular space 9' molded over the entire circumference at the inner circumference of the stator assembly 6' and on its face side. The gear pump 4' is attached to the stator assembly 6' with the aid of an elastic means 10', wherein the elastic means 10' is fixed by means of screws 14'. The gear pump 4' possesses a fluid inlet 12' and a fluid outlet 13'. The electronically commutated direct current motor 3' and the gear pump 4' form a compact module that is arranged in a recess within the tank 2' and there is fixed by means of attachment screws 11'. For this, the stator assembly 6' has attachment projections 16' with feedthroughs 17'. The stator assembly 6' consists of a stator core 31 extrusion-coated by a thermosetting plastic material.

Figure 6:
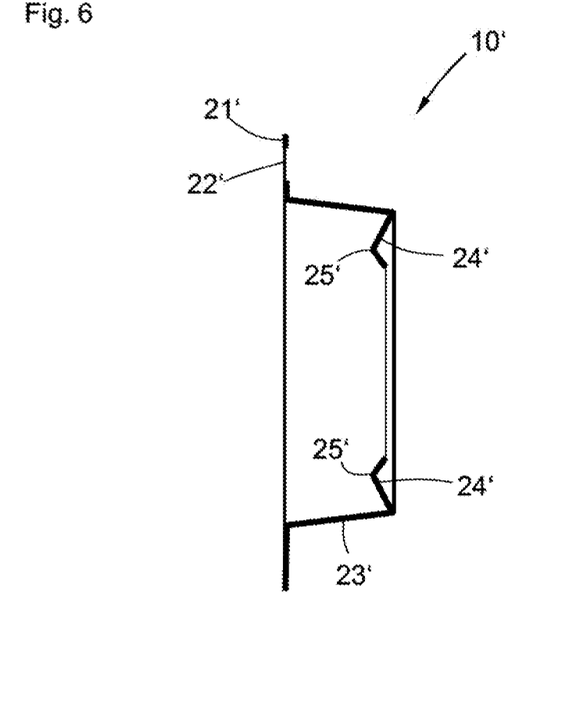
FIG. 6 is a spring element in section.

FIG. 6 shows the elastic means 10' from FIG. 5 as a single component in section. In its basic form, the elastic means 10' has a pot shape with collar that serves as an attachment flange 21' and is provided with multiple attachment eyes 22'. The pot floor is pierced in the middle region. The remaining outer part consists of a plurality of spring arms 24' which respectively have a kink 25'. A pot wall 23' that is somewhat inclined relative to a hollow cylinder extends between the attachment flange 21' and the spring arms 24'.

Figure 7:
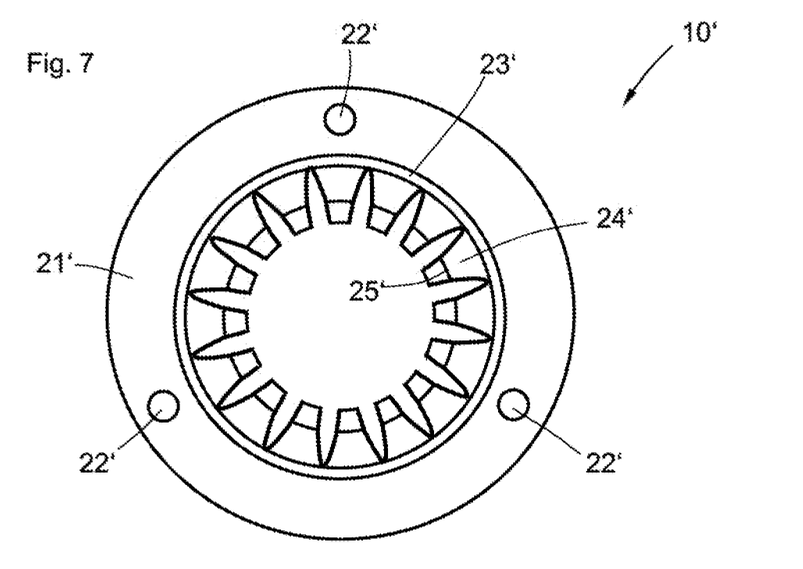
FIG. 7 is the spring element in plan view.

FIG. 7 shows the elastic means 10' from FIG. 6 in plan view, with the attachment flange 21', the attachment eyes 22', the pot wall 23', the spring arms 24', and the kinks 25'.

Figure 8:
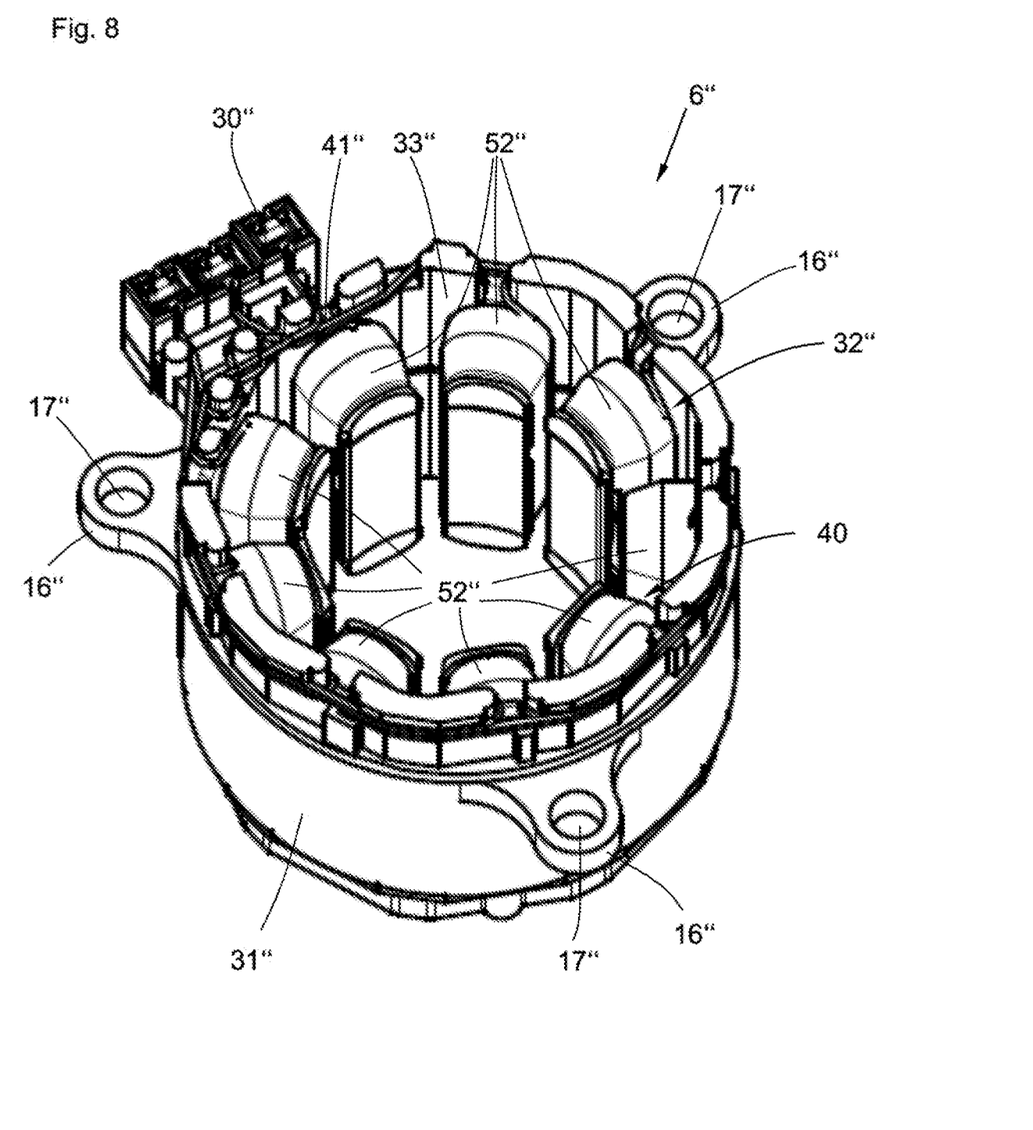
FIG. 8 is a spatial representation of a wound stator.

FIG. 8 shows a spatial depiction of a wound stator assembly 6" which, in the exemplary embodiments according to the invention, can be used for a pump drive. The stator assembly 6" comprises a stator core 31" in the form of a laminated core, attachment projections 16" with feedthroughs 17", an insulation body 33", a winding 32" which consists of nine individual coils 52", and a wiring unit 30" to which coil wires 41" are connected and which forms a plug terminal. The wiring unit 30" additionally provides for a wiring of the individual coils 52" of the winding 32". Here, the winding 32" is executed as a delta connection with, respectively, three individual coils 52" in series. It is a three-phase winding, wherein each individual coil 52" of one phase is spatially separated from, respectively, two individual coils 52" of another phase.

In the first embodiment in FIG. 1, it is provided that the stator assembly 6 have a rotor accommodation space 49 with a first internal diameter d1 and a pump accommodation space 55 with a second internal diameter d2, wherein the second internal diameter d2 is larger than the first internal diameter d1, whereby a shoulder 27 is formed. The stator assembly 6 is designed so that the components of the positive displacement pump 4 can be joined without an undercut.

The installation of a metallic elastic means 10 (FIG. 2) between the stator assembly 6 and a multi-part pump housing 15 allows a necessary balance of play between the stator assembly 6 and the positive displacement pump 4. This elastic means 10 is preferably an undulating washer, which is very simple in design and available at any time. The elastic means 10 ensures that the housing parts of the positive displacement pump 4 rest upon one another. With low temperatures and freezing fluid, the elastic means 10 may additionally prevent destruction of the pump housing 15 in the event that the ice pressure is greater in a pump chamber than in a wet region 53 outside of the pump chamber.

Alternatively as shown in FIG. 5, the elastic means 10 may serve as an attachment means which is arranged between one or more screws 14 and the positive displacement pump 4, outside of a wet region 53. For this, a crown-shaped metallic spring may be installed at the stator assembly 6 with the aid of screws 14. With a symmetrical design, the positive displacement pump 4 may thereby assume an arbitrary angle position in relation to the stator assembly 6. The elastic means 10 preferably consists of spring steel. In this second embodiment as well, the elastic means 10 may compensate for an increasing ice pressure at low temperatures.

The positive displacement pump 4 may, advantageously, be screwed to the stator assembly 6 in such a way that the screw or screws 14 is/are screwed into the plastic material of the stator assembly 6. For this, it is reasonable to select a material with high strength as a plastic material for the stator assembly 6. Self-tapping screws are preferably used, whereby it is sufficient to shape threadless cylindrical cavities. This allows a simpler design of an injection molding tool and a simpler removal of the workpieces from the injection molding tool with whose help the stator assembly 6 is manufactured.

It is provided for thermosetting plastic material for the stator assembly 6 to be used, because this may satisfy high sealing requirements and high strength requirements.

With reference to FIGS. 1-5, according to a further aspect of the invention, it is provided that the stator core 31 comprise attachment projections 16 which are provided with feedthroughs 17. The attachment projections 16 serve for the attachment, in particular, screwing, of the stator assembly 6, and therefore of the pump drive 1, to a tank 2 of an SCR system, for example. Since the attachment projections 16 are essentially formed by the material of the stator core 31, these allow a very robust attachment of the pump drive 1.

Alternatively, attachment projections 16 may also be formed by the plastic material of the stator assembly 6, or by a combination of plastic material and stator core material.

In order to seal the wet region 53 from a dry region 54 outside of the pump drive 1, a seal ring 8 is arranged between the stator assembly 6 and the pump housing 15. The seal ring 8 is preferably a radial seal ring, in particular, an annular cord seal (O-ring). It is thereby a standard component. The seal ring 8 is placed into an annular space 9 which is formed, on one side, by a third internal diameter d3 of the stator assembly 6 which is larger than the second internal diameter d2, and, on the other side, by an axially-recessed annular region of a pump head 43. At the stator assembly 6 and at the pump head 43, the seal ring 8 respectively rests radially on cylinder shell surfaces, which may, advantageously, be executed without mold release in the shown design.

It is further provided that the permanent magnet rotor 7 and the greater part of the positive displacement pump 4 be arranged in the wet region 53, wherein the wet region 53 is bounded by the stator assembly 6 and by a pump head 43. A single seal ring 8 is thereby sufficient for sealing the pump drive 1.

The positive displacement pump 4 may have a pump housing 15 that is formed in two or three parts (See FIG. 1). Preferably, a three-part pump housing 15 is provided, wherein the pump head 43, a middle part 44, and a pump cover 45 are provided. The middle part 44 is arranged, sandwich-like, between the pump head 43 and the pump cover 45. The three pump parts 43, 44, 45 are held together by the elastic means 10 and screws 14 which attach the pump head 43 in the stator assembly 6.

The positive displacement pump 4, expediently, comprises a freezing compensation structure 5. This consists of an elastic and yielding, in particular, rubber-like-material. The freezing compensation structure 5 serves to form a compressible compensation space which to compensate for a volume increase due to the freezing pumping medium, for example, aqueous urea solution.

A simple installation possibility consists in the freezing compensation structure 5 being positively connected to the pump housing 15 via master forming. For this, connection projections 26 which hold the freezing compensation structure 5 in a positive fit are injected with the pump cover 45. The pump housing 15 preferably consists of a thermosetting plastic material, or, alternatively, of a sintered metal material.

It is also provided that, in the plastic material of the stator assembly 6, sensors 50 be arranged axially, relative to the permanent magnet rotor 7. These are thereby sensors for detecting the magnetic field surrounding the permanent magnet rotor 7. In particular, Hall effect sensors or GMR sensors are therefore suitable here. The signal quality is best if the sensors 50 are arranged near the permanent magnet rotor 7. It is thereby additionally advantageous that no metallic separating can is present, which might attenuate the detectable magnetic field of the permanent magnet rotor 7. The sensors 50 serve as rotor position sensors, and are electrically connected to a wiring unit 30 via baffle plates embedded into the plastic material of the stator assembly 6. The wiring unit 30 essentially consists of a plug terminal, which additionally serves as a wiring means for individual coils 52 of the winding 32.

The second aim is achieved via a modular pump drive family for covering different delivery pressure ranges and/or discharge rate ranges, wherein the wound stator core 31 is extrusion-coated by a plastic material that can be processed via injection molding, said wound stator core 31 thereby forming a stator assembly 6 that is compact and sealed against the fluid to be conveyed; the positive displacement pump 4 is accommodated axially relative to the permanent magnet rotor 7 in the stator assembly 6 and is attached to said stator assembly 6; and wherein the individual pump drives 1 differ from one another via different stator lengths, stator diameters, rotor lengths, rotor diameters, and/or different positive displacement pumps 4, and/or equipment variants; wherein the equipment variants have the following equipment features: control electronics for activating windings 32 of the stator assembly 6, and/or at least one position sensor integrated into the electronically commutated electric motor.

The pump drive family is characterized by standardized components, whereby a high flexibility is provided in the product offering, as well as a large number of product variants. This relates to the electronically commutated direct current motor 3, on the one hand, and the positive displacement pump 4, on the other. Both the motor and the pump may be quickly and simply adapted to new conditions. The combination of motor and pump variants even further increases the possible number of variations.

For example, the motor properties can via lengthening of the motor, thus of the stator core 31 and of the permanent magnet rotor 7. This has the advantage that the pump geometry is normally not influenced by this. A variation in the diameter of the motor is also conceivable. Various motor speeds and torques can also be achieved via adaptation of the winding 32. The mechanical interface to the positive displacement pump 4 and the seal ring 8 thereby remain unchanged.

To adapt to different requirements, it is provided that the positive displacement pumps 4 have different gear diameters and/or gear heights/gear widths. Different discharge rates and different delivery pressures thereby result. The middle part 44 is thereby likewise to be adapted.

In order to achieve a high parts commonality, it is proposed that the diameter and/or the wall thickness of the pump head 43 in its axial direction be designed for a maximum discharge and/or a maximum delivery pressure. In this way, the external diameter of the pump parts and the internal diameter of the stator assembly 6 may remain the same, and nevertheless a high variability of the pump capacity and/or of the delivery pressure may be achieved by exchanging the middle part 44 and gears 19, 20 accommodated therein.

Control electronics integrated into the pump drive 1 may be completely omitted. In this instance, the control tasks are reasonably taken on by an external control module which is, for example, a component of a system controller. The electrical interface is formed by a wiring unit 30 which comprises the line terminals and the control signal terminals—for example, in the form of a plug terminal.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

| | |
|---|---|
| 1 | pump drive |
| 2 | tank |
| 3 | direct current motor |
| 4 | positive displacement pump |
| 5 | freezing compensation |
| 6 | stator assembly |
| 7 | permanent magnet rotor |
| 8 | seal ring |
| 9 | annular space |
| 10 | elastic means |
| 11 | attachment screw |
| 12 | fluid inlet |
| 13 | fluid outlet |
| 14 | screw |
| 15 | pump housing |
| 16 | attachment projection |
| 17 | feedthrough |
| 18 | central axle |
| 19 | first gear |
| 20 | second gear |
| 21 | attachment flange |
| 22 | attachment eyes |
| 23 | pot wall |
| 24 | spring arm |
| 25 | kink |
| 26 | connection projection |
| 27 | shoulder |
| 28 | dividing line |
| 29 | hydraulic connection |
| 30 | wiring unit |
| 31 | stator core |
| 32 | winding |
| 33 | insulation body |
| 34 | groove |
| 35 | connection seal |
| 36 | guide contour |
| 37 | extension |
| 38 | pump flange |
| 39 | opening |
| 40 | stator slot |
| 41 | coil wire |
| 42 | axis |
| 43 | pump head |
| 44 | middle part |
| 45 | pump cover |
| 46 | hollow shaft |
| 47 | bearing bushing |
| 48 | protrusion |
| 49 | rotor accommodation space |
| 50 | sensor |
| 51 | sensor connection line |
| 52 | single coil |
| 53 | wet region |
| 54 | dry region |
| 55 | pump accommodation space |
| 56 | mold contour |

What is claimed is:

1. A pump drive for conveying fluids, the pump drive comprising:
   an electronically commutated direct current motor having a permanent magnet rotor arranged within a wound stator core;
   a positive displacement pump;
   a multi-part pump housing forming part of the positive displacement pump;
   a metallic elastic means arranged between the stator assembly and the multi-part pump housing;
   a plastic material forming a coating around the wound stator core, the plastic material being extruded;
   the wound stator core forming a stator assembly that is sealed against the fluid to be conveyed, and
   the positive displacement pump being accommodated axially relative to the permanent magnet rotor in the stator assembly, and being attached to the stator assembly, wherein the stator assembly includes a rotor accommodation space with a first internal diameter and a pump accommodation space with a second internal diameter, wherein the second internal diameter is larger than the first internal diameter, whereby a shoulder is formed.

2. The pump drive according to claim 1, further comprising a wet region surrounding the magnet rotor; wherein the elastic means is an undulating washer which is arranged in the wet region between the stator assembly and the positive displacement pump, and wherein the undulating washer is supported on the shoulder of the stator assembly.

3. The pump drive according to claim 1, further comprising a wet region; a pump housing including a pump head; and screws for securing the pump head as part of the pump housing, wherein the elastic means is arranged between the screws and the positive displacement pump, outside of the wet region.

4. The pump drive according to claim 3, further comprising means for installing the positive displacement pump at an arbitrary angle position in relation to the stator assembly.

5. The pump drive according to claim 1, further comprising at least one screw, wherein the positive displacement pump is screwed to the stator assembly so that the at least one screw is screwed into the plastic material of the stator assembly.

6. The pump drive according to claim 1, wherein the plastic material of the stator assembly is a thermosetting plastic.

7. The pump drive according to claim 1, wherein the stator core comprises attachment projections which are provided with feedthroughs.

8. The pump drive according to claim 1, further comprising a pump head of a pump housing; a wet region; a dry region; and a seal ring for separating the dry region from the wet region, the seal ring being arranged between the stator assembly and the pump head of the pump housing.

9. The pump drive according to claim 8, wherein the seal ring is an annular cord seal.

10. The pump drive according to claim 8, wherein the permanent magnet rotor and part of the positive displacement pump are arranged in the wet region, wherein the wet region is bounded by the stator assembly and by the pump head.

11. The pump drive according to claim 1, wherein the pump housing of the positive displacement pump comprises a pump head, a middle part, and a pump cover, the middle part being arranged between the pump head and the pump cover.

12. The pump drive according to claim 1, further comprising sensors arranged axially, relative to the permanent magnet rotor in the plastic material of the stator assembly.

13. A pump drive for conveying fluids, the pump drive comprising:
    an electronically commutated direct current motor having a permanent magnet rotor arranged within a wound stator core;
    a positive displacement pump; and
    a plastic material forming a coating around the wound stator core, the plastic material being extruded;
    the wound stator core forming a stator assembly that is sealed against the fluid to be conveyed, and
    the positive displacement pump being accommodated axially relative to the permanent magnet rotor in the stator assembly, and being attached to the stator assembly,
    wherein the positive displacement pump includes a freezing compensation structure.

14. The pump drive according to claim 13, wherein the freezing compensation structure is made of a rubber material.

15. The pump drive according to claim 13, wherein the freezing compensation structure is connected in a positive fit to the pump housing.

* * * * *